United States Patent
Ting et al.

(10) Patent No.: US 10,060,806 B2
(45) Date of Patent: Aug. 28, 2018

(54) MULTI-AXIS PIEZOELECTRIC STRESS-SENSING DEVICE, MULTI-AXIS PIEZOELECTRIC STRESS-SENSING DEVICE POLARIZATION METHOD, AND PIEZOELECTRIC SENSING DETECTION SYSTEM THEREOF

(71) Applicant: Chung-Yuan Christian University, Chung Li, Tao Yuan County (TW)

(72) Inventors: Yung Ting, Chung Li (TW); Sheuan-Perng Lin, Chung-Li (TW); Yu-Heng Lin, Chung Li (TW)

(73) Assignee: Chung-Yuan Christian University, Chung Li, Tao Yuan County (TW)

( * ) Notice: Subject to any disclaimer, the term of this patent is extended or adjusted under 35 U.S.C. 154(b) by 0 days.

(21) Appl. No.: 15/153,141

(22) Filed: May 12, 2016

(65) Prior Publication Data

US 2017/0082506 A1 Mar. 23, 2017

(30) Foreign Application Priority Data

Sep. 23, 2015 (TW) .............................. 104131403 A

(51) Int. Cl.
*G01L 1/00* (2006.01)
*G01L 1/16* (2006.01)
*H02N 2/00* (2006.01)

(52) U.S. Cl.
CPC ................ *G01L 1/16* (2013.01); *H02N 2/004* (2013.01)

(58) Field of Classification Search
CPC ................................... G01L 1/16; H02N 2/004

USPC .................................................... 73/774, 777
See application file for complete search history.

(56) References Cited

U.S. PATENT DOCUMENTS

| | | | |
|---|---|---|---|
| 5,571,972 A | 11/1996 | Okada | |
| 6,081,066 A * | 6/2000 | Tsutsui | H03H 9/0528 310/348 |
| 8,749,123 B2 * | 6/2014 | Muraki | G01K 7/16 310/346 |
| 2001/0011858 A1 * | 8/2001 | Iino | H02N 2/0015 310/323.06 |
| 2002/0075099 A1 * | 6/2002 | Itasaka | H03H 9/178 333/189 |
| 2002/0171410 A1 * | 11/2002 | Akahane | H02N 2/004 324/76.49 |
| 2007/0035463 A1 * | 2/2007 | Hirabayashi | H01Q 21/24 343/824 |
| 2009/0308172 A1 * | 12/2009 | Ladani | G01N 3/38 73/765 |

(Continued)

*Primary Examiner* — Max Noori
(74) *Attorney, Agent, or Firm* — Muncy, Geissler, Olds & Lowe, P.C.

(57) ABSTRACT

A multi-axis piezoelectric stress-sensing device, a multi-axis piezoelectric stress-sensing device polarization method, and a piezoelectric sensing detection system thereof are disclosed. The piezoelectric sensing detection system is used for a machining tool. The multi-axis piezoelectric stress-sensing device includes a piezoelectric sensing film, a first electrode, a second electrode, a third electrode, and a fourth electrode. The piezoelectric sensing film has four corners. The first electrode, the second electrode, the third electrode and the fourth electrode are located at the four corners of the piezoelectric sensing film, and at least one electrode is used to polarize another electrode according to at least one polarization direction.

5 Claims, 4 Drawing Sheets

(56) References Cited

U.S. PATENT DOCUMENTS

| | | | |
|---|---|---|---|
| 2012/0008365 A1* | 1/2012 | Kaneko | G11C 11/22 365/145 |
| 2012/0249413 A1* | 10/2012 | Sugahara | G09G 5/00 345/156 |
| 2014/0203684 A1* | 7/2014 | Yamamoto | B06B 1/0603 310/322 |

* cited by examiner

MULTI-AXIS PIEZOELECTRIC STRESS-SENSING DEVICE, MULTI-AXIS PIEZOELECTRIC STRESS-SENSING DEVICE POLARIZATION METHOD, AND PIEZOELECTRIC SENSING DETECTION SYSTEM THEREOF

BACKGROUND OF THE INVENTION

1. Field of the Invention

The present invention relates to a multi-axis piezoelectric stress-sensing device, multi-axis piezoelectric stress-sensing device polarization method, and piezoelectric sensing detection system thereof, and more particularly, the present invention relates to a multi-axis piezoelectric stress-sensing device, multi-axis piezoelectric stress-sensing device polarization method, and piezoelectric sensing detection system thereof which can measure automatically the bearing force of a machining tool.

2. Description of the Related Art

With advancements in technology, much research has focused on the measurement of the cutting force of machining tools for obtaining cutting measurement data and further improving the cutting mode to enhance the cutting accuracy and the cutting efficiency, or for monitoring the cutting conditions. An additional goal of such research is to prevent damage to the cutter or machine failure. The measurement of the cutting force of a machining tool is also crucial to the development of intelligent machining tools. In the prior art, a dynamometer is disposed in the end of a workpiece for measuring indirectly the stress in the workpiece. However, the accuracy of the dynamometer, the cost of such systems, and the high probability of damage in the prior art are difficult to overcome. In addition, when a PVDF piezoelectric film sensor with general thickness mode polarization and a length direction load is used to measure the deformation of the surface of the cutter, at least three sets, each of which includes six sensors, must be attached to the cutter. Then a cutting radial force, a cutting tangential force, and a cutting axial force can be determined by complicated calculations. In this method, three of the sensors need to be disposed opposite to the cutting direction at suitable angles for measuring the values accurately. However, such measurement incurs great difficulties.

Therefore, it is necessary to provide a new multi-axis piezoelectric stress-sensing device, a multi-axis piezoelectric stress-sensing device polarization method, and a piezoelectric sensing detection system thereof to solve the problem of the prior art.

SUMMARY OF THE INVENTION

The main object of the present invention is to provide a multi-axis piezoelectric stress-sensing device which can measure the bearing force of the machining tool automatically.

Another object of the present invention is to provide a multi-axis piezoelectric stress-sensing device polarization method used for manufacturing the multi-axis piezoelectric stress-sensing device.

Another object of the present invention is to provide a piezoelectric sensing detection system including the multi-axis piezoelectric stress-sensing device.

To achieve the abovementioned and other objects, the multi-axis piezoelectric stress-sensing device of the present invention includes a piezoelectric sensing film, a first electrode, a second electrode, a third electrode, and a fourth electrode. The piezoelectric sensing film has four corners. The first electrode, the second electrode, the third electrode, and the fourth electrode are located at the four corners of the piezoelectric sensing film, and at least one electrode is used to polarize another electrode according to at least one polarization direction.

The multi-axis piezoelectric stress-sensing device polarization method of the present invention includes the following steps: providing the piezoelectric sensing film; providing the first electrode, the second electrode, the third electrode, and the fourth electrode, which are respectively disposed at the four corners of the piezoelectric sensing film; and applying at least one electrode to polarize another electrode according to at least one polarization direction.

The piezoelectric sensing detection system of the present invention is used for a machining tool. The machining tool includes a cutter used for machining a material. The piezoelectric sensing detection system comprises a multi-axis piezoelectric stress-sensing device and a signal processing module. The multi-axis piezoelectric stress-sensing device is disposed on a location of the cutter without contacting the material. When the material is machined by the cutter, a piezoelectric sensing signal is generated by the multi-axis piezoelectric stress-sensing device. The signal processing module is coupled to the multi-axis piezoelectric stress-sensing device, and a force bearing situation of the cutter is obtained according to the piezoelectric sensing signal.

BRIEF DESCRIPTION OF THE DRAWINGS

These and other objects and advantages of the present invention will become apparent from the following descriptions of the accompanying drawings, which disclose several embodiments of the present application. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

To enable persons skilled in the art to understand the technical contents of the present invention, the present invention is herein described with preferred embodiments and accompanying drawings.

Figure 1:
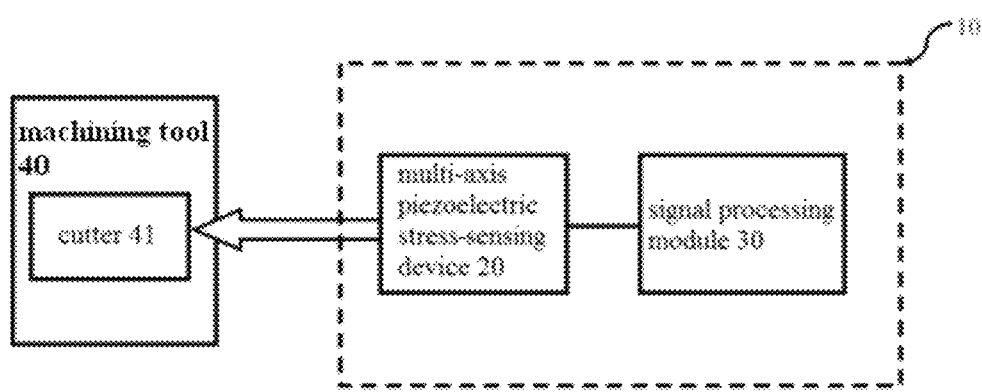
FIG. 1 is a schematic drawing illustrating the piezoelectric sensing detection system of the present invention.

Please refer to FIG. 1 for a schematic drawing illustrating the piezoelectric sensing detection system of the present invention.

Figure 4:
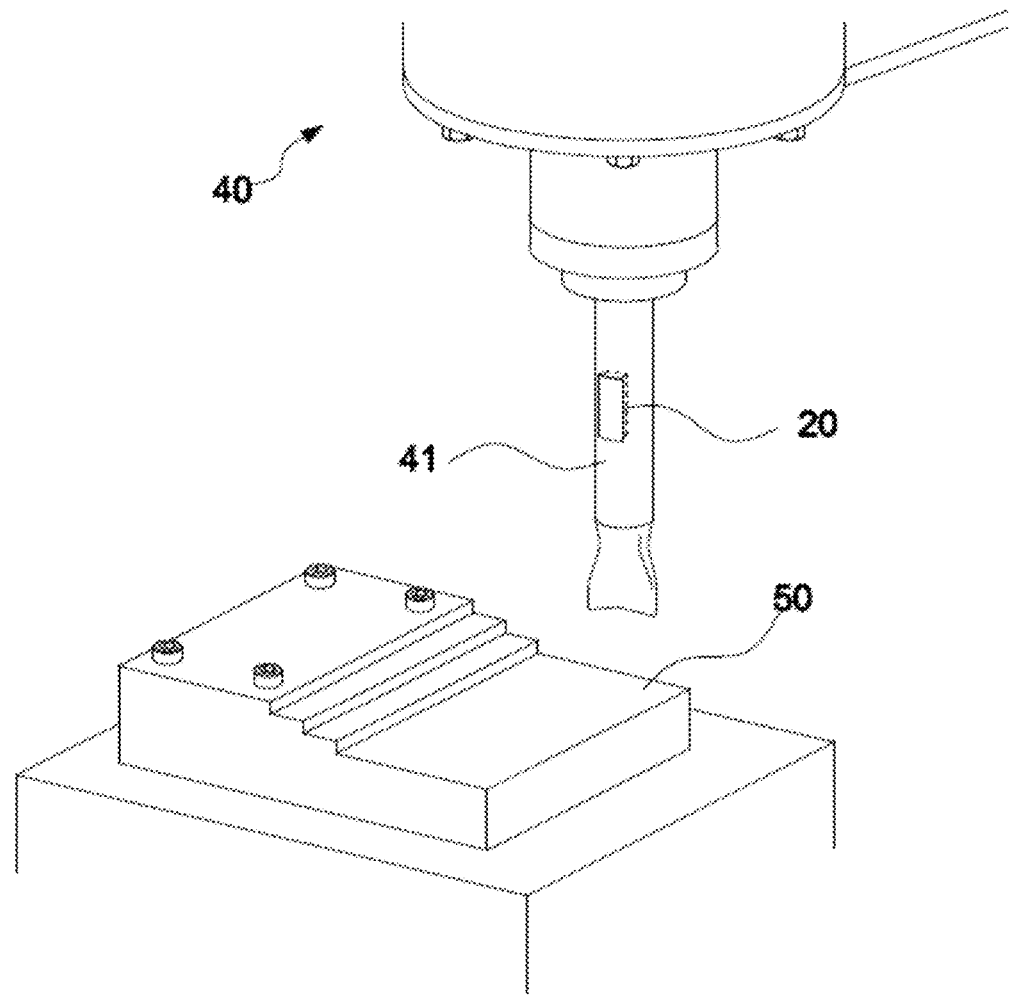
FIG. 4 is a schematic drawing illustrating the multi-axis piezoelectric stress-sensing device of the present invention disposed in the machining tool.

The piezoelectric sensing detection system 10 of the present invention is used for detecting a stress force on a machine or a material. In one embodiment of the present invention, the piezoelectric sensing detection system 10 of the present invention is used for measuring a cutting force of a machining tool 40. However, the present invention is not limited to this. The machining tool 40 includes a cutter 41 for machining a workpiece 50 (as shown in FIG. 4). The cutter 41 is a lathing cutter or a milling cutter for lathing or milling a workpiece 50 respectively. However, the piezoelectric sensing detection system 10 of the present invention is not limited to the above modes of processing tools. The piezoelectric sensing detection system 10 can include a multi-axis piezoelectric stress-sensing device 20 and a signal processing module 30. The multi-axis piezoelectric stress-sensing device 20 has six polarization directions and is disposed on a location of the cutter 41 without contacting the workpiece 50. When the workpiece 50 is machined by the cutter 41, the multi-axis piezoelectric stress-sensing device 20 can generate a piezoelectric sensing signal in response to the deformation of the surface of the cutter 41. The multi-axis piezoelectric stress-sensing device 20 is connected to the signal processing module 30 electrically in a wired or wireless manner and transmits the piezoelectric sensing signal to the signal processing module 30. The signal processing module 30 is coupled to the multi-axis piezoelectric stress-sensing device 20 so that a force bearing situation of the cutter 41 can be obtained according to the piezoelectric sensing signal. The signal processing module 30 can be in the form of a hardware device, a software program, firmware, or a combination thereof, and it can also be in the form of a circuit loop or any other appropriate arrangement. On the other hand, each module can be self-contained. Alternatively, each module can also operate in conjunction with the others. Furthermore, this embodiment is intended to be illustrative of a preferred embodiment of the present invention and, for the sake of brevity, is not described in detail in terms of any possible combination of variations.

Figure 2:
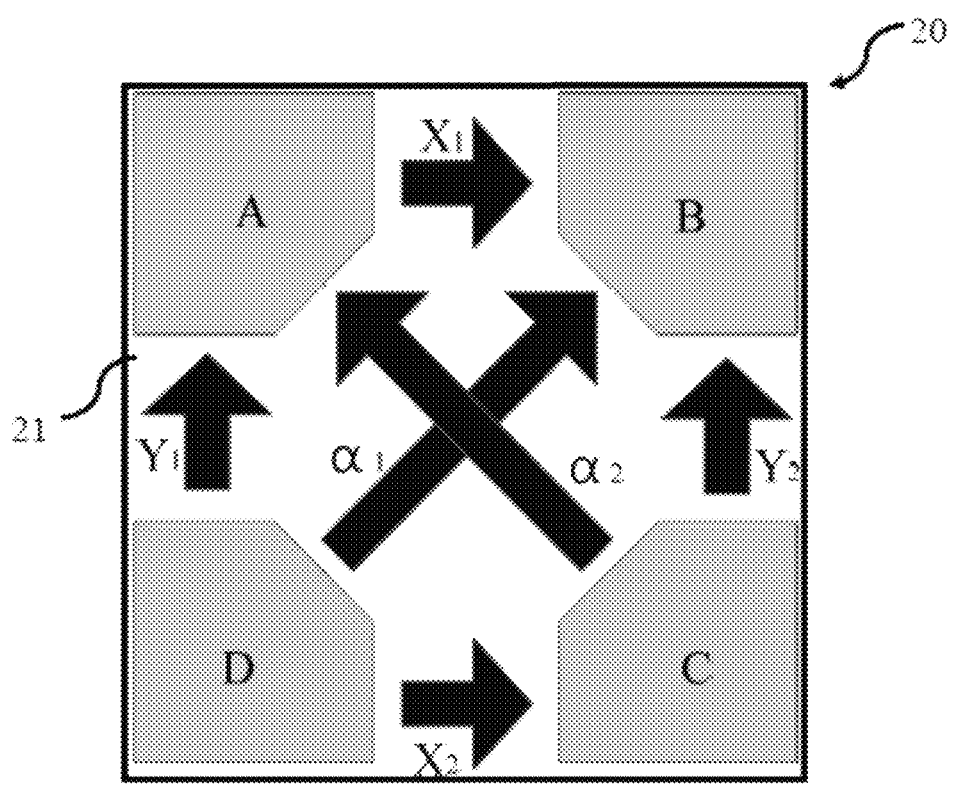
FIG. 2 is a schematic drawing illustrating the multi-axis piezoelectric stress-sensing device of the present invention with polarization.

Please refer to FIG. 2 for a schematic drawing illustrating the multi-axis piezoelectric stress-sensing device of the present invention with polarization.

In one embodiment of the present invention, the multi-axis piezoelectric stress-sensing device 20 includes a piezoelectric sensing film 21, a first electrode A, a second electrode B, a third electrode C, and a fourth electrode D. The material of the piezoelectric sensing film 21 is made by the method of surface transverse length polarization, wherein the material of the piezoelectric sensing film 21 is Polyvinylidene Difluoride (PVDF). The piezoelectric sensing film 21 has four corners. The piezoelectric sensing film 21 can be manufactured by the hot-deformation process such that the piezoelectric sensing film 21 is transformed from a crystal dimorphism to β crystal dimorphism in order that the piezoelectric sensing film 21 will have better piezoelectric and pyroelectric properties. The process of the manufacture of the piezoelectric sensing film 21 is not illustrated in detail here, for it is well known to those of ordinary skill in the art.

The first electrode A, the second electrode B, the third electrode C, and the fourth electrode D are disposed at the four corners of the piezoelectric sensing film 21, and at least one electrode is used to polarize another electrode according to at least one polarization direction. This is, in one embodiment of the present invention, the first electrode A, the second electrode B, the third electrode C, and the fourth electrode D are disposed at the four corners of the piezoelectric sensing film 21 in a clockwise sequence, and the polarization direction includes the direction of the first electrode A toward the second electrode B (the first polarization direction X1 as shown as FIG. 1), wherein the polarization method includes the steps as follows: applying positive high voltage on the first electrode A, and the second electrode B is the ground or negative high voltage. Next, a polarizing process occurs along the direction of the fourth electrode D toward the third electrode C (second polarization direction X2), a polarizing process occurs along the direction of the fourth electrode D toward the first electrode A (third polarization direction Y1), a polarizing process occurs along the direction of the third electrode C toward the second electrode B (fourth polarization direction Y2), a polarizing process occurs along the direction of the fourth electrode D toward the second electrode B (fifth polarization direction $\alpha1$), and a polarizing process occurs along the direction of the third electrode C toward the first electrode A (sixth polarization direction $\alpha2$). By this design, the piezoelectric sensing film 21 can have six polarization directions.

Figure 3:
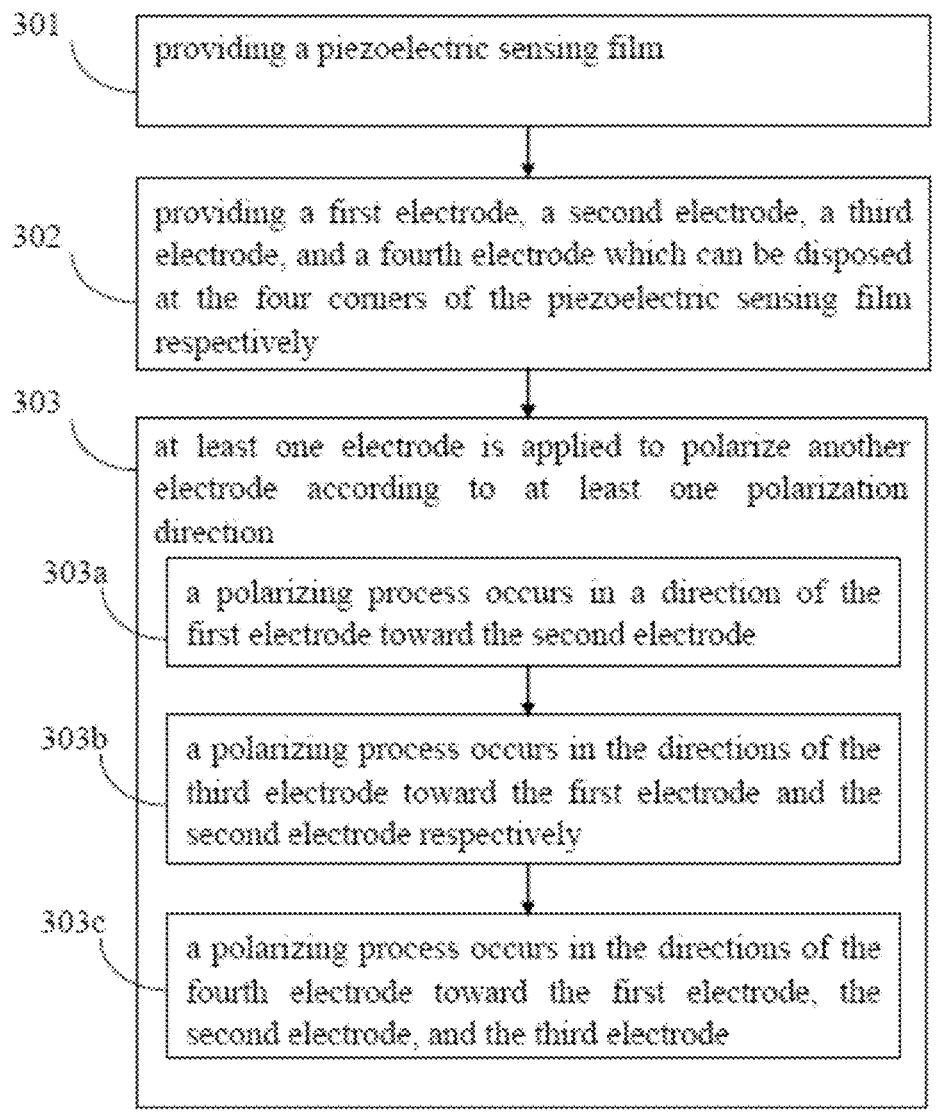
FIG. 3 is a flowchart of the multi-axis piezoelectric stress-sensing device polarization method of the present invention.

Please refer to FIG. 3 for a flowchart of the multi-axis piezoelectric stress-sensing device polarization method of the present invention.

As shown in FIG. 3, please note that although the multi-axis piezoelectric stress-sensing device 20 is used below for explaining the multi-axis piezoelectric stress-sensing device applied in the polarization method of the present invention, the multi-axis piezoelectric stress-sensing device applied in the polarization method of the present invention is not limited to only the structure of the multi-axis piezoelectric stress-sensing device 20.

First proceed with step 301: providing a piezoelectric sensing film 21.

In step 301, a polyvinylidene fluoride film is provided first, and then the piezoelectric sensing film 21 is manufactured by the hot-deformation process.

Next proceed with step 302: providing a first electrode A, a second electrode B, a third electrode C, and a fourth electrode D which can be disposed at the four corners of the piezoelectric sensing film 21 respectively.

Next, the first electrode A, the second electrode B, the third electrode C, and the fourth electrode D are attached at the four corners of the piezoelectric sensing film 21 in a clockwise sequence.

Finally, proceed with step 303: applying at least one electrode to polarize another electrode according to at least one polarization direction.

In step 303, at least one electrode is applied to polarize another electrode according to at least one polarization direction, and multiple polarization directions can be obtained in the multi-axis piezoelectric stress-sensing device 20.

In one embodiment of the present invention, step 303 further includes steps 303*a* to 303*c*. However, the present invention is not limited to this embodiment.

This is, first proceed with step 303*a*: a polarizing process occurs in a direction of the first electrode toward the second electrode.

First, positive high voltage is applied on the first electrode A, and the second electrode B is a ground or negative high voltage, whereby a polarizing process occurs in a direction of the first electrode A toward the second electrode B (the first polarization direction X1 as shown as FIG. 1).

Next proceed with step 303*b*: a polarizing process occurs in the directions of the third electrode toward the first electrode and the second electrode respectively.

Next, the same polarization method is applied; a polarizing process occurs in a direction of the third electrode C toward the first electrode A (sixth polarization direction $\alpha2$), and a polarizing process occurs in a direction of the third electrode C toward the second electrode B (fourth polarization direction Y2).

Finally, proceed with step 303c: a polarizing process occurs in the directions of the fourth electrode toward the first electrode, the second electrode, and the third electrode.

Finally, a polarizing process occurs in a direction of the fourth electrode D toward the first electrode A (third polarization direction Y1), a polarizing process occurs in a direction of the fourth electrode D toward the second electrode B (fifth polarization direction α1), and a polarizing process occurs in a direction of the fourth electrode D toward the third electrode C (second polarization direction X2). Thus, the multi-axis piezoelectric stress-sensing device 20 can be manufactured. Therefore, six polarization directions can be obtained in the multi-axis piezoelectric stress-sensing device 20.

Please note that the multi-axis piezoelectric stress-sensing device polarization method of the present invention is not restricted to the abovementioned sequence. The sequence can be different as long as it is able to achieve the objectives of the present invention.

Finally, please refer to FIG. 4 for a schematic drawing illustrating the multi-axis piezoelectric stress-sensing device of the present invention disposed in the machining tool.

As shown in FIG. 4, in one embodiment of the present invention, the piezoelectric sensing detection system 10 of the present invention is used in the cutter 41 of the machining tool 40, which can lathe or mill the workpiece 50. The multi-axis piezoelectric stress-sensing device 20 is disposed on a location of the cutter 41 without contacting the workpiece 50, and the multi-axis piezoelectric stress-sensing device 20 is not limited to being attached to the cutter 41 with the form of a flat surface or a curved surface. When the workpiece 50 is machined by the cutter 41, a piezoelectric sensing signal is generated by the multi-axis piezoelectric stress-sensing device 20 due to the deformation of the surface of the cutter 41, wherein the multi-axis piezoelectric stress-sensing device 20 is connected to the signal processing module 30 electrically in a wireless manner. Therefore, when the voltage between two electrodes changes due to compressive stress or tensile stress, the position of one electrode relative to the other electrode can be obtained by detection of the change in voltage. Take the multi-axis piezoelectric stress-sensing device 20 as shown in FIG. 2 for example; when the voltage of the first electrode A is lower than the voltage of the second electrode B, it represents the presence of tensile stress between the first electrode A and the second electrode B. When the voltage of the first electrode A is higher than that of the second electrode B, it represents the presence of compressive stress between the first electrode A and the second electrode B. When the voltage difference between the first electrode A and the second electrode B increases, the stress exerted between the first electrode A and the second electrode B is greater. The signal processing module 30 needs only to count the difference in voltage of the first polarization direction X1 to the sixth polarization direction α2 in the multi-axis piezoelectric stress-sensing device 20, and the stress relationship between each of the two electrodes can be obtained. Because the piezoelectric sensing signals received by the cutter 41 and the multi-axis piezoelectric stress-sensing device 20 are dependent on the material and the shape of the cutter 41, the position of the multi-axis piezoelectric stress-sensing device 20, the material of the tooling workpiece 50, and the tooling manner, the signal processing module 30 or other computer system can calculate the abovementioned parameters. Then the force bearing situation, the direction of force, and the amount of deformation of the cutter 41 can be obtained. Furthermore, data such as the cutting radial force, the cutting tangential force, and the cutting axial force also can be obtained for monitoring the cutting force of the cutter 41.

Although the invention has been described with reference to the above embodiments, it will be apparent to one of the ordinary skill in the art that modifications to the described embodiments may be made without departing from the spirit of the invention. Accordingly, the scope of the invention will be defined by the attached claims rather than by the above detailed descriptions.

What is claimed is:

1. A multi-axis piezoelectric stress-sensing device, comprising:
    a piezoelectric sensing film having four corners;
    a first electrode;
    a second electrode;
    a third electrode; and
    a fourth electrode;
    wherein the first electrode, the second electrode, the third electrode, and the fourth electrode are located at the four corners of the piezoelectric sensing film, respectively;
    wherein one electrode of one corner is used to polarize another electrode of another corner according to at least one polarization direction, so that the piezoelectric sensing film has multiple polarization directions.

2. The multi-axis piezoelectric stress-sensing device as claimed in claim 1, wherein the first electrode, the second electrode, the third electrode, and the fourth electrode are disposed at the four corners of the piezoelectric sensing film in a clockwise sequence, and the polarization directions include a direction of the first electrode toward the second electrode, a direction of the fourth electrode toward the third electrode, a direction of the fourth electrode toward the first electrode, a direction of the third electrode toward the second electrode, a direction of the fourth electrode toward the second electrode, and a direction of the third electrode toward the first electrode, so that the piezoelectric sensing film has six polarization directions.

3. The multi-axis piezoelectric stress-sensing device as claimed in claim 1, wherein the piezoelectric sensing film is a surface transverse length polarizing film.

4. A multi-axis piezoelectric stress-sensing device polarization method, comprising:
    providing a piezoelectric sensing film;
    providing a first electrode, a second electrode, a third electrode, and a fourth electrode which are disposed at the four corners of the piezoelectric sensing film, respectively; and
    applying one electrode of one corner to polarize another electrode of another corner according to at least one polarization direction, so that the piezoelectric sensing film has multiple polarization directions.

5. The multi-axis piezoelectric stress-sensing device polarization method as claimed in claim 4, further comprising:
    disposing the first electrode, the second electrode, the third electrode, and the fourth electrode at the four corners of the piezoelectric sensing film in a clockwise sequence;
    a polarizing process occurring in the direction of the first electrode toward the second electrode;
    a polarizing process occurring in the directions of the third electrode toward the first electrode and the second electrode respectively; and
    a polarizing process occurring in the direction of the fourth electrode toward the first electrode, the direction of the fourth electrode toward the second electrode, and the direction of the fourth electrode toward the third electrode, so that the piezoelectric sensing film has six polarization directions.

\* \* \* \* \*